(12) United States Patent
Lei

(10) Patent No.: US 12,013,510 B2
(45) Date of Patent: Jun. 18, 2024

(54) MULTI-RESOLUTION BASED METHOD FOR AUTOMATED ACOUSTIC LOG DEPTH TRACKING

(71) Applicant: Schlumberger Technology Corporation, Sugar Land, TX (US)

(72) Inventor: Ting Lei, Arlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 189 days.

(21) Appl. No.: 17/759,050

(22) PCT Filed: Jan. 20, 2021

(86) PCT No.: PCT/US2021/014152
§ 371 (c)(1),
(2) Date: Jul. 19, 2022

(87) PCT Pub. No.: WO2021/150585
PCT Pub. Date: Jul. 29, 2021

(65) Prior Publication Data
US 2023/0037176 A1 Feb. 2, 2023

Related U.S. Application Data

(60) Provisional application No. 62/963,310, filed on Jan. 20, 2020.

(51) Int. Cl.
*G01V 1/50* (2006.01)

(52) U.S. Cl.
CPC ............ *G01V 1/50* (2013.01); *G01V 2200/16* (2013.01); *G01V 2210/42* (2013.01); *G01V 2210/47* (2013.01); *G01V 2210/6222* (2013.01)

(58) Field of Classification Search
None
See application file for complete search history.

(56) References Cited

U.S. PATENT DOCUMENTS

| 4,698,793 | A | 10/1987 | Wu |
| 6,625,541 | B1 | 9/2003 | Shenoy et al. |
| 6,654,688 | B1* | 11/2003 | Brie ................ G01V 1/48 703/10 |
| 6,845,325 | B2 | 1/2005 | Valero et al. |
| 8,547,789 | B2* | 10/2013 | Wu ................ G01V 1/48 367/34 |
| 2003/0206486 | A1 | 11/2003 | Valero et al. |
| 2018/0038980 | A1 | 2/2018 | Goodyear et al. |

(Continued)

FOREIGN PATENT DOCUMENTS

WO 2019084219 A1 5/2019

OTHER PUBLICATIONS

Blyth et al., A new standard in real-time LWD sonic capability: Improving confidence in critical wellbore stability and formation evaluation decisions., Jun. 16-20, 2012, Society of Petrophysicists and Well Log Analysts (SPWLA), SPWLA 2012-169 (Year: 2012).*

(Continued)

*Primary Examiner* — Carlos Garcia
(74) *Attorney, Agent, or Firm* — Jeffrey D. Frantz

(57) ABSTRACT

Aspects of the disclosure provide for a method using clusters of sonic peaks from a logging tool to generate a log of an acoustic property of the formation as a function of depth.

11 Claims, 15 Drawing Sheets

(56) References Cited

U.S. PATENT DOCUMENTS

2019/0361138 A1 11/2019 Bennett et al.
2021/0396902 A1 12/2021 Lei et al.

OTHER PUBLICATIONS

Lei et al, Robust Sonic Log Tracking Using a Multi-Resolution Approach, May 17-20, 2021, Society of Petrophysicists and Well Log Analysts (SPWLA), DOI: 10.30632/SPWLA-2021-0102 (Year: 2012).*
Chikenji et al., 2.25-IN. Slim Sonic Tool With Multiple Conveyance Options, May 14-18, 2011, Society of Petrophysicists and Well Log Analysts (SPWLA), SPWLA 2011-aaaa (Year: 2011).*
Morris et al., A New Sonic Array Tool for Full Waveform Logging, Sep. 16-19, 1984, Society of Petroleum Engineers of AIME, SPE 13285 (Year: 1984).*
International Preliminary Report on Patentability issued in PCT/US2021/014152 dated Aug. 4, 2022, 6 pages.
Substantive Exam issued in Saudi Arabia Patent Application No. 522433340 dated Jun. 22, 2023, 12 pages.
Kimball et al., Semblance processing of borehole acoustic array data, Geophysics, 49, 3, 274-281, 1984.
MacQueen, J. B. (1967). Some Methods for classification and Analysis of Multivariate Observations. Proceedings of 5th Berkeley Symposium on Mathematical Statistics and Probability. University of California Press. pp. 281-297.
Ester et al., (1996). A density-based algorithm for discovering clusters in large spatial databases with noise. Proceedings of the Second International Conference on Knowledge Discovery and Data Mining (KDD-96). AAAI Press. pp. 226-231.
Gao et al., "Implementing the Nelder-Mead simplex algorithm with adaptive parameters", Computational Optimization and Applications. 51:1, pp. 259-277, 2012.
International Search Report and Written Opinion issued in PCT/US2021/014152, dated Apr. 29, 2021 (10 pages).

* cited by examiner

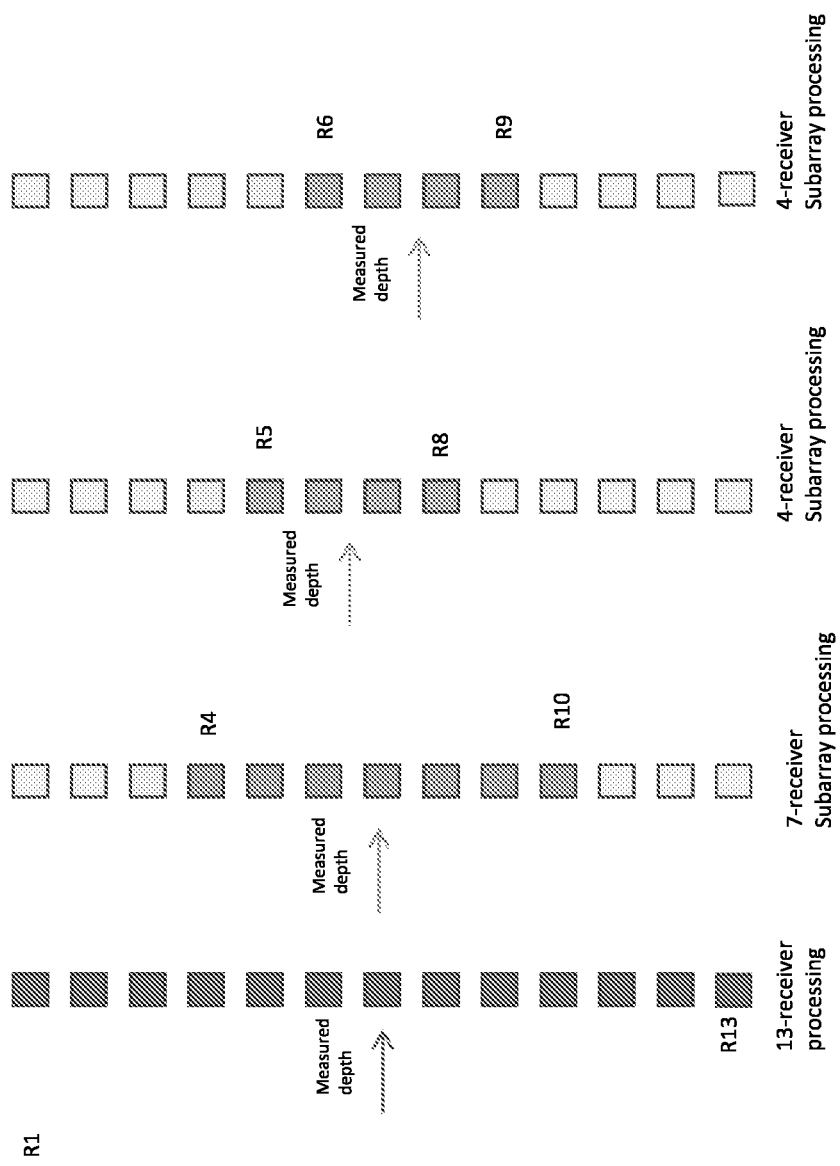

MULTI-RESOLUTION BASED METHOD FOR AUTOMATED ACOUSTIC LOG DEPTH TRACKING

CROSS-REFERENCE TO RELATED APPLICATIONS

The present application is a National Stage Entry of International Application No. PCT/US2021/014152, filed Jan. 20, 2021, which claims priority to U.S. Provisional Patent Application 62/963,310 filed Jan. 20, 2020, the entirety of which is incorporated by reference.

FIELD

The present disclosure relates to methods and systems that use downhole sonic logging measurements to derive information pertaining to subsurface formation structures.

BACKGROUND INFORMATION

Using downhole measurements to derive information pertaining to subsurface formation structures continues to be of increasing importance for oil and gas exploration and development. Early in the development of an oil and gas field, surface seismic and electromagnetic measurements are particularly helpful for discerning the coarse and large-scale structures of the subsurface. Furthermore, vertical seismic profile (VSP) measurements and, more recently, electromagnetics logging while drilling (LWD) measurements can be used to determine information that characterizes subsurface formation structures relatively near the wellbore. All of this information can aid oil and gas companies to make improved exploration and development decisions.

Traditionally, acoustic logging for formation evaluation refers to the process of lowering an acoustic logging device into a fluid-filled well and then recording the waveforms at an array of receivers at every depth (e.g., every 0.5 ft) in the logged interval under downhole conditions. Once the waveforms are recorded, an interpretation workflow is required either at wellsite or offsite to process the recorded waveforms to get the formation compressional and shear slownesses of each measured depth. Finally, a tracking process is used to connect compressional and shear slownesses along these depths to form continuous compressional and shear logs.

However, because of the existence of thin layers that causes elastic properties to vary dramatically within the depth sample increment (such as 0.5 ft) as well as downhole logging noises, the tracking process can sometimes be very tricky for automated computer programs and consequently requires manual relabeling process, which limits the ability of wellsite compressional and shear log delivery.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method of characterizing properties of structures of interest in a formation traversed by a borehole is disclosed. The method may comprise operating a sonic logging tool in the borehole to transmit acoustic signals that probe nearby formation structures and to receive acoustic signals that result from interaction with the nearby formation structures. The method may also provide for generating waveform data associated with the received acoustic signals as a function of measured depth in the wellbore. The method may also provide for acquiring and/or processing the waveform data to identify or label clusters of Slowness-Time-Coherence peaks. The method may also provide for tracking at least one cluster of Slowness-Time-Coherence peaks over varying depth values. The method may also provide for performing a coherence optimization process on the at least one cluster of Slowness-Time-Coherence peaks to produce data. The method may further provide for generating a log of an acoustic property of the formation as a function of depth based on the data produced by the coherence optimization process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

FIG. 2A is a schematic diagram of full array processing of acoustic waveform data acquired by an acoustic logging tool with 13 receivers;

FIG. 2B is a schematic diagram of a 7-receiver subarray processing of acoustic waveform data acquired by an acoustic logging tool with 13 receivers;

FIGS. 2C and 2D are schematic diagrams of 4-receiver subarray processing of acoustic waveform data acquired by an acoustic logging tool with 13 receivers;

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1A:
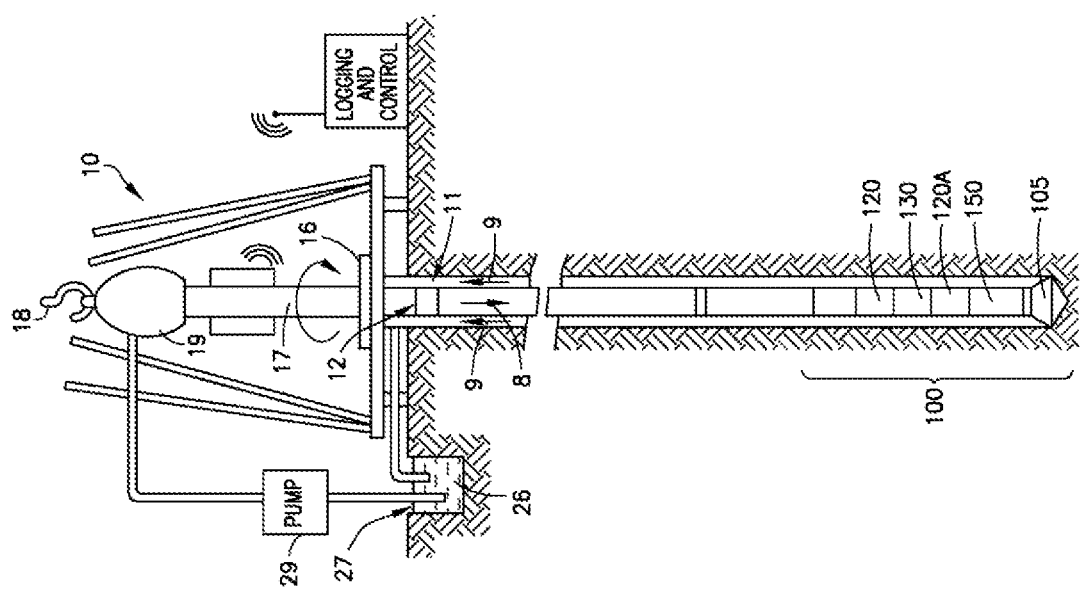
FIG. 1A is a schematic diagram illustrating an example wellsite which can embody parts of the methodology or workflow of the present disclosure.

FIG. 1A illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotary table 16 may be energized by a device or system (not shown). The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18. Additionally or alternatively, a top drive system may be used to impart rotation to the drill string 12.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 1A includes a logging-while-drilling (LWD) module 120, a measuring-while-drilling (MWD) module 130, a roto-steerable system and motor 150, and the drill bit 105.

The LWD module 120 may be housed in a special type of drill collar and can contain one or more logging tools. In some examples, the bottom hole assembly 100 may include additional LWD and/or MWD modules. The LWD module 120 may include capabilities for measuring, processing, and storing information, as well as for communicating with the surface equipment.

The MWD module 130 may also be housed in a drill collar and can contain one or more devices for measuring characteristics of the drill string 12 and/or the drill bit 105. The MWD tool 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

In embodiments, the LWD module 120 includes a sonic measuring device or tool that includes at least one acoustic source or transmitter spaced from an array of acoustic receivers or sensors. The at least one acoustic transmitter can include a monopole transmitter and/or a dipole transmitter and/or a multipole transmitter as is well known in the arts. The transmitter is operated to emit wavefronts that probe the near wellbore structures (e.g., fractures, nearby bed boundaries and faults, etc.) by propagating, reflecting, and refracting across these structures. The acoustic receivers can cooperate with at least one processing system of the tool to receive and record the resulting wavefronts in synchronization with the firing of the signal to obtain the sonic waveform data at varying depths in the borehole 11 as is well known. The recorded sonic waveform data at varying depths in the borehole can then be filtered and processed further for logging, for example by a surface-located data processing system, according to the details of the improved workflow as described herein.

Figure 1B:
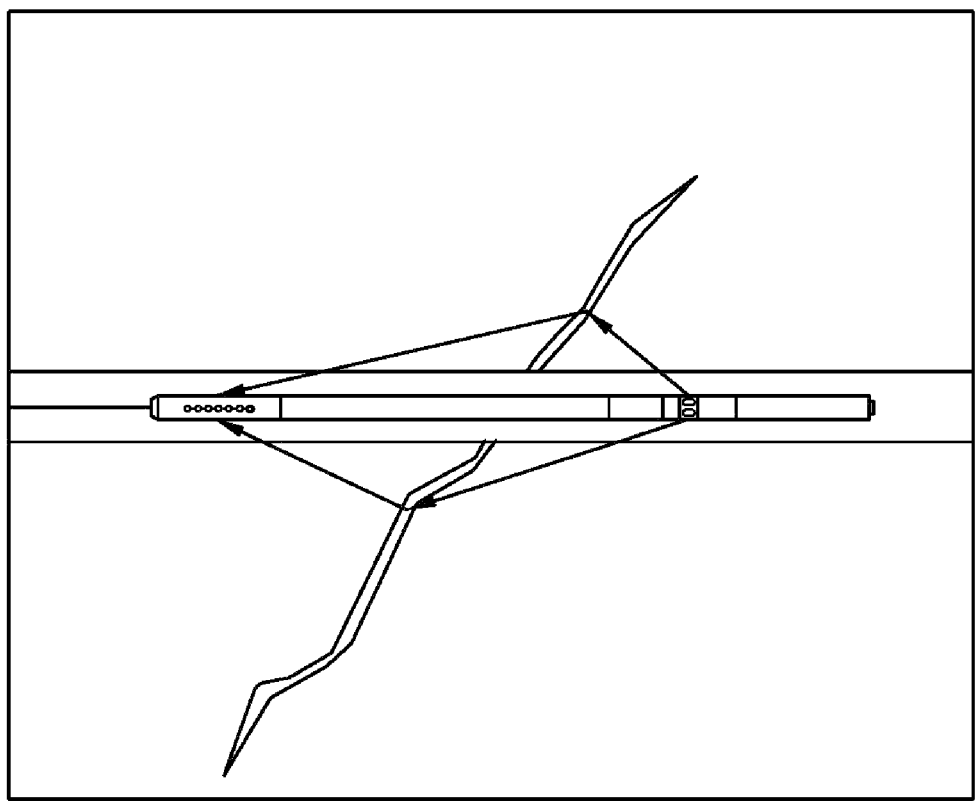
FIG. 1B is a schematic diagram illustrating an example wireline sonic logging tool which can embody parts of the methodology or workflow of the present disclosure.

Although the components of FIG. 1A are shown and described as being implemented in a particular conveyance type, the examples disclosed herein are not limited to a particular conveyance type but, instead, may be implemented in connection with different conveyance types including, for example, coiled tubing, wireline, wired drill pipe and/or any other conveyance types known in the industry. For example, FIG. 1B illustrates a wireline sonic measuring device or tool that functions in a similar manner to the LWD sonic measuring tool 120 of FIG. 1A.

Array based borehole acoustic waveform processing techniques, such as the Slowness-Time-Coherence (STC) method, are commonly used to get compressional and shear slownesses of the rock formation that surrounds the borehole. See Kimball et al., "Semblance processing of borehole acoustic array data", Geophysics, 49, 3, 274-281, 1984.

These methods attempt to search the slowness of acoustic waveforms traveling across an array of receivers by maximizing the coherence, which then yields the STC peaks. Because the receiver aperture of the array acoustic logging tool can be as long as several feet, the STC peaks projected to slowness represent averaged values of elastic properties of the rock volume covered by the receiver array. In the tracked log, the value is defined at a measurement depth, which is located at the middle of the receiver array.

A subarray processing technique can also be used to enhance the depth resolution. In this case, the workflow generates logs of varying resolution, which is defined by number of receivers multiplied by the inter-receiver spacing. For example, for an acoustic logging tool with 13 receivers (FIG. 2A) and inter-receiver spacing of 0.5 ft., a 7-receiver subarray processing will yield a resolution of 3 ft. with the measured depth located at receiver No. 7 as shown in FIG. 2B. In other examples shown in FIGS. 2C and 2D, 4-receiver subarray processing will yield a resolution of 1.5 ft. and the measured depth is in the middle of receivers No. 6 and No. 7 (FIG. 2C) or in the middle of receivers No. 7 and No. 8 (FIG. 2D). We can treat different resolution slowness values as measurements for different rock volumes. However, they are still closely correlated to the same measurement physics, and consequently a joint interpretation can improve the robustness. This information can be used to guide the tracking process.

Figure 3:
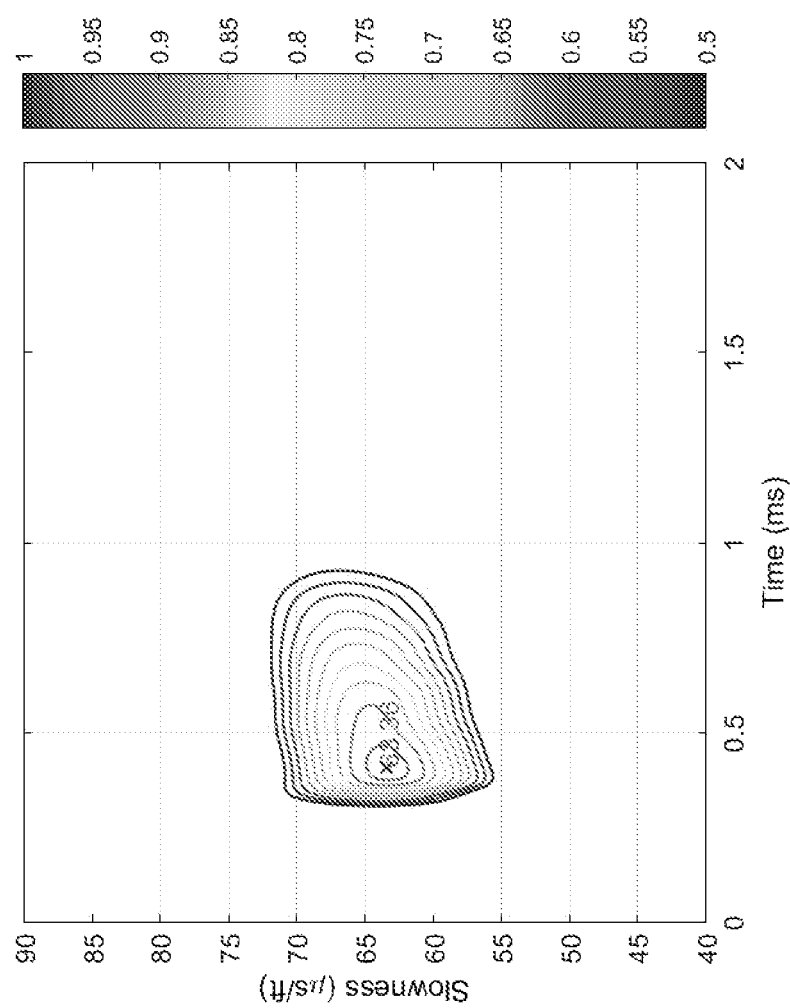
FIG. 3 is a plot of STC values as a function of slowness and time for a given depth, which shows a well-defined coherence peak.
Figure 4:
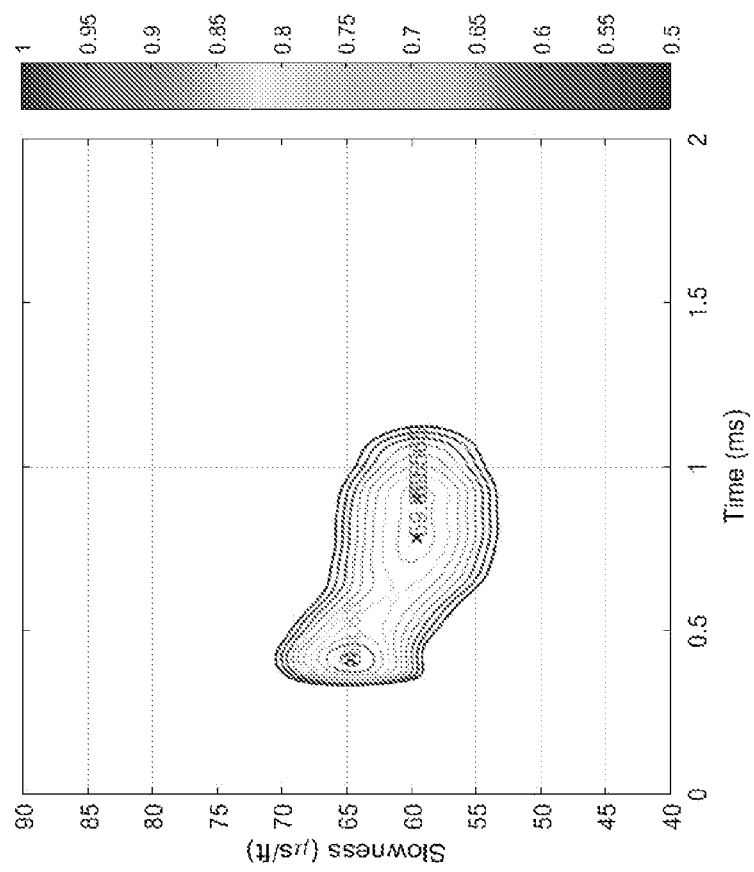
FIG. 4 is a plot of STC values as a function of slowness and time for a given depth, which shows two coherence peaks.
Figure 5:
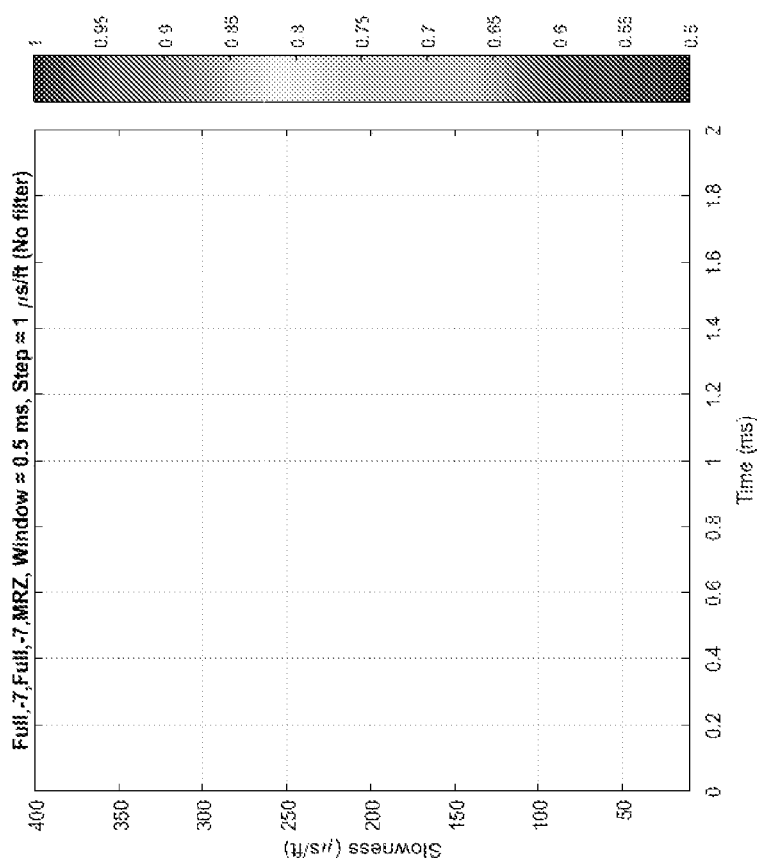
FIG. 5 is a plot of STC values as a function of slowness and time for a given depth, which show no coherence peak due to layer contrast or downhole noise.

A typical example of the results of STC processing is shown in FIG. 3, where the coherence peak is located at arrival time of 0.5 ms (x-axis) and the slowness of 65 μs/ft (y-axis). The peak slowness is then labeled as the compressional slowness of depth k. For its neighboring depth k+1 or k−1, a peak that is close in arrival time and slowness value will be labeled also as compressional slowness of the depth k+1 or k−1 using methods described in co-owned U.S. Pat. Nos. 6,625,541 and 6,625,541, the contents of each are herein incorporated by reference. However, sometimes due to the existence of thin layers or the bad borehole shape, we may observe that multiple STC peaks in a depth. Such an example is shown in FIG. 4, which is from a synthetic example with a varying layer. On the other hand, we may also observe no peak can be found using the STC algorithm. Such an example is shown in FIG. 5, which is from another synthetic example with a large contrast layer. If the STC peak of true formation signal is absent, then a tracking algorithm may mis-label an STC peak of a noise as the formation slowness or may leave a gap in the tracked slowness log.

Figure 6:
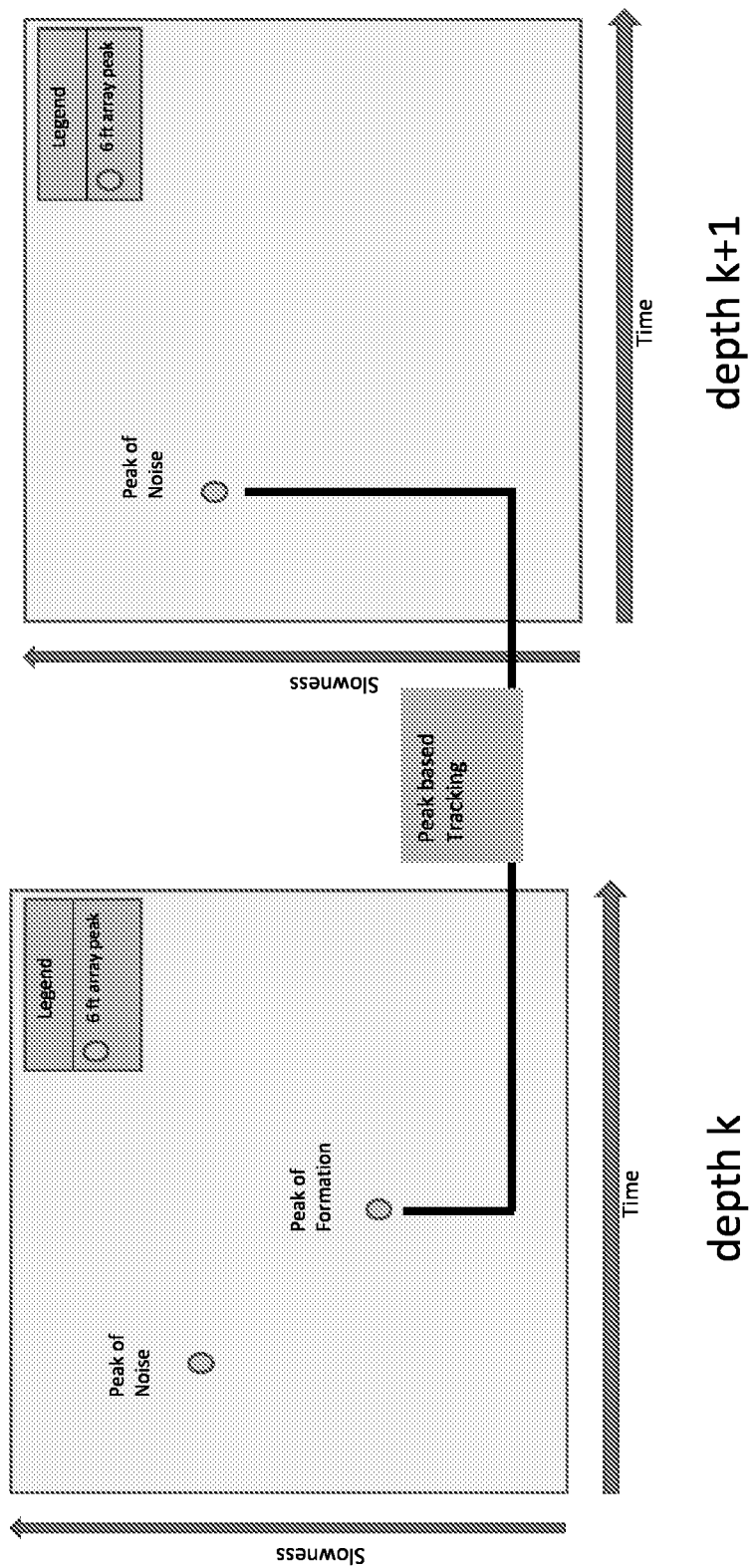
FIG. 6 is a schematic diagram illustrating traditional single-resolution STC peak depth tracking from a depth k to a depth k+1.
Figure 7:
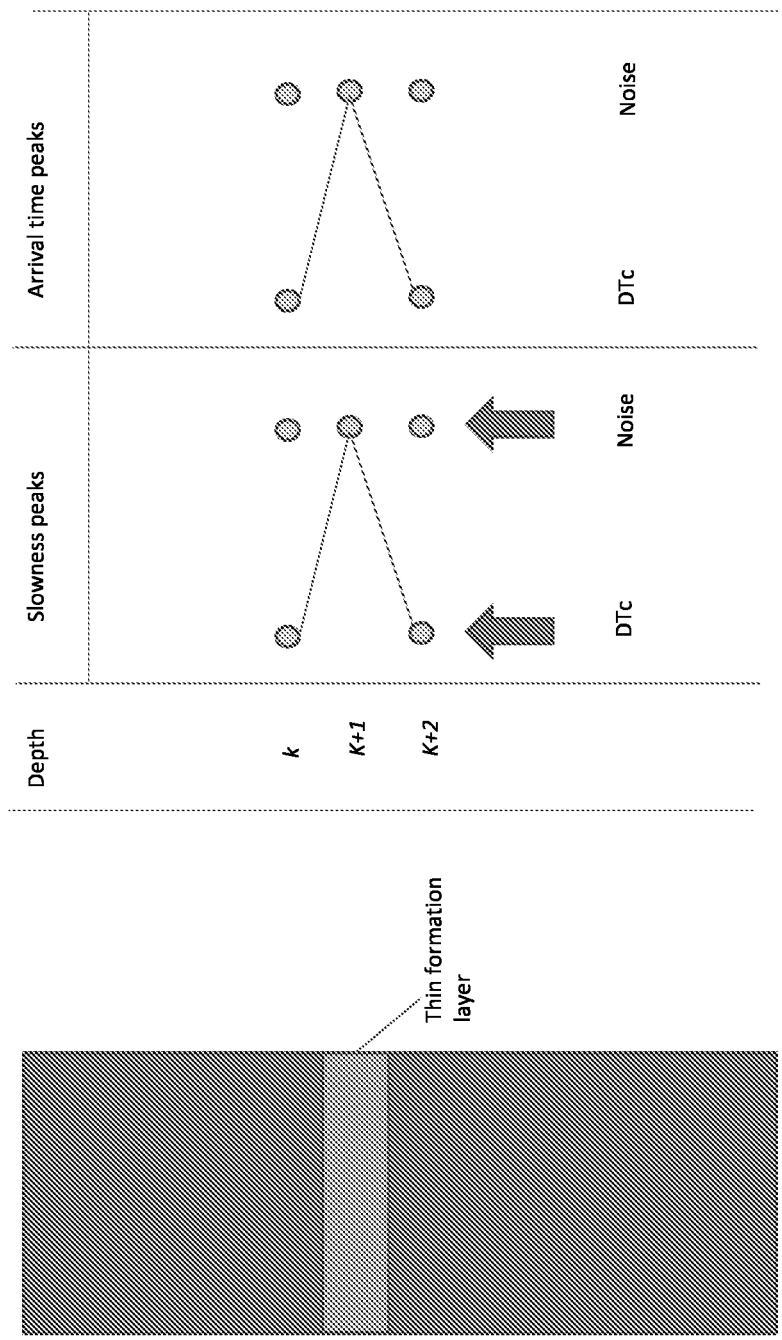
FIG. 7 is a schematic diagram of an acoustic log resulting from single-resolution STC peak tracking of FIG. 6 when crossing a thin formation layer.

For example, in FIG. 6, the formation STC peak is correctly labeled for the depth k. However, in the event that the formation STC peak becomes absent at depth k+1 due to noise or other contamination, then the tracking algorithm may peak the noise as formation signal. Such labeling will result in an outlier in the sonic log, as shown in FIG. 7.

Figure 8:
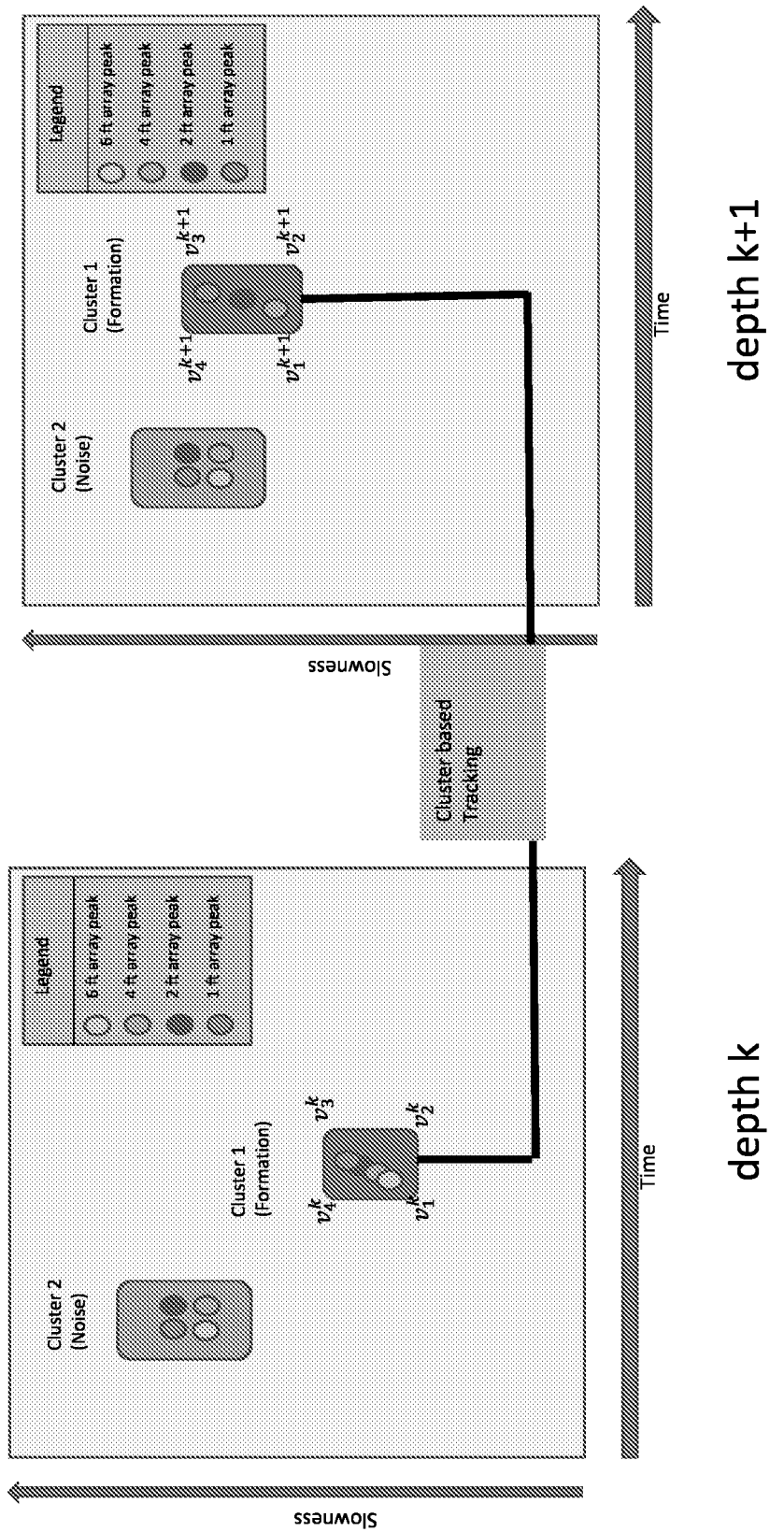
FIG. 8 is a schematic diagram of multi-resolution STC peak cluster depth tracking, where a box is clustered by different resolution STC peaks and then tracked from depth k to depth k+1 using its 4 vertices.
Figure 9:
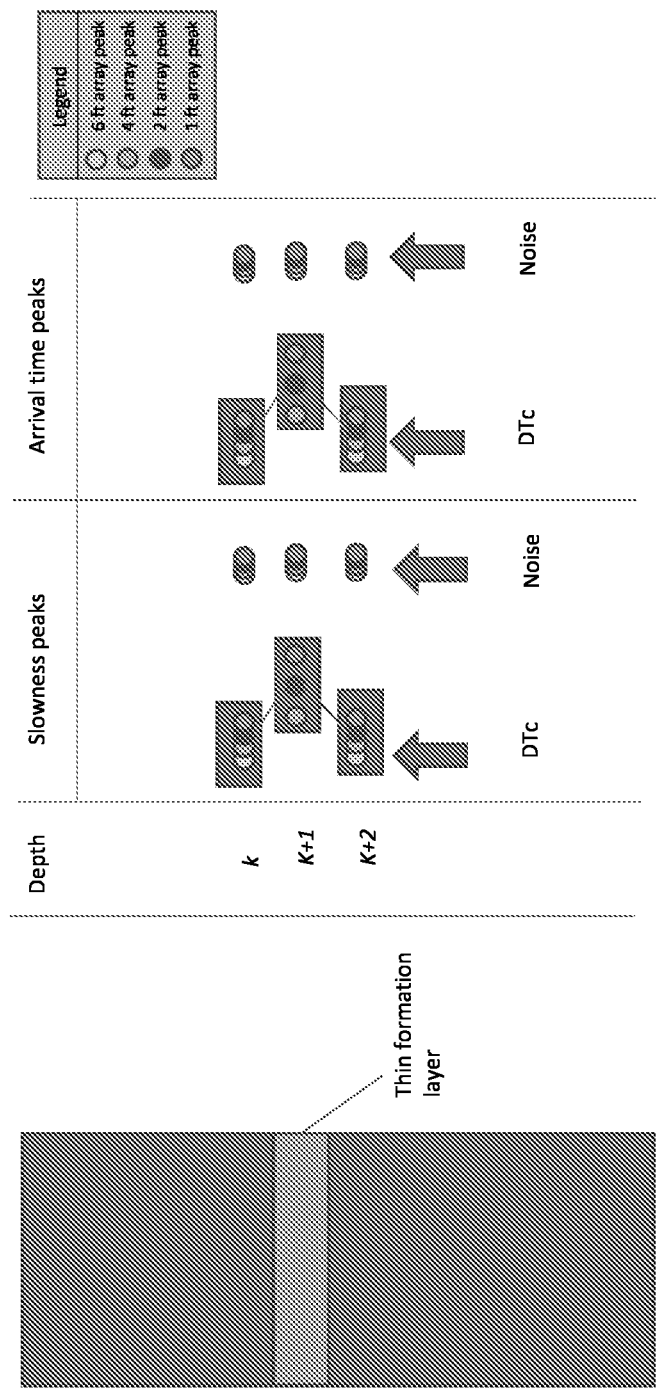
FIG. 9 is a schematic diagram of an acoustic log resulting from the multi-resolution STC peak cluster depth tracking of FIG. 8 when crossing a thin formation layer.

To resolve the issue described above, a multi-resolution method or workflow is proposed in the present disclosure. An illustrative embodiment of a multi-resolution method or workflow in accordance with the present disclosure is shown in FIG. 8. As provided in FIG. 8, different resolution STC peaks are firstly grouped together using a machine-learning based clustering algorithm, such as the k-means or Density-based spatial clustering of applications with noise (DB-SCAN) method (See Martin et al., "A density-based algorithm for discovering clusters in large spatial databases with noise", Proceedings of the Second International Conference on Knowledge Discovery and Data Mining (KDD-96). AAAI Press. pp. 226-231), or many variations of these methods. Then we can apply the tracking algorithm to the cluster vertices (defined as v_1, v_2, v_3, v_4) depth by depth. As shown from the legend in FIG. 8, in the case where a STC peak is missing (e.g., the 6 ft. peak), such a cluster-based tracking approach is still able to track the cluster from depth k to depth k+1 using the cluster vertices' movement. Consequently, the projected slowness log curves become continuous and represent true formation signals as shown in FIG. 9. Once the cluster is correctly labeled, we can select one of the coherence peaks inside the cluster to represent the formation slowness value (e.g., the 2-ft peak), or we can further apply the deconvolution algorithm descripted in (See Co owned PCT Patent Appl. No. PCT/US2019/057912, filed on Oct. 24, 2019, entitled "System and method for generating slowness logs in thinly laminated formations", hereinafter PCT/US2019/057912) to select the most reliable coherence peak as well as a QC log.

Figures 10A, 10B, 10C:
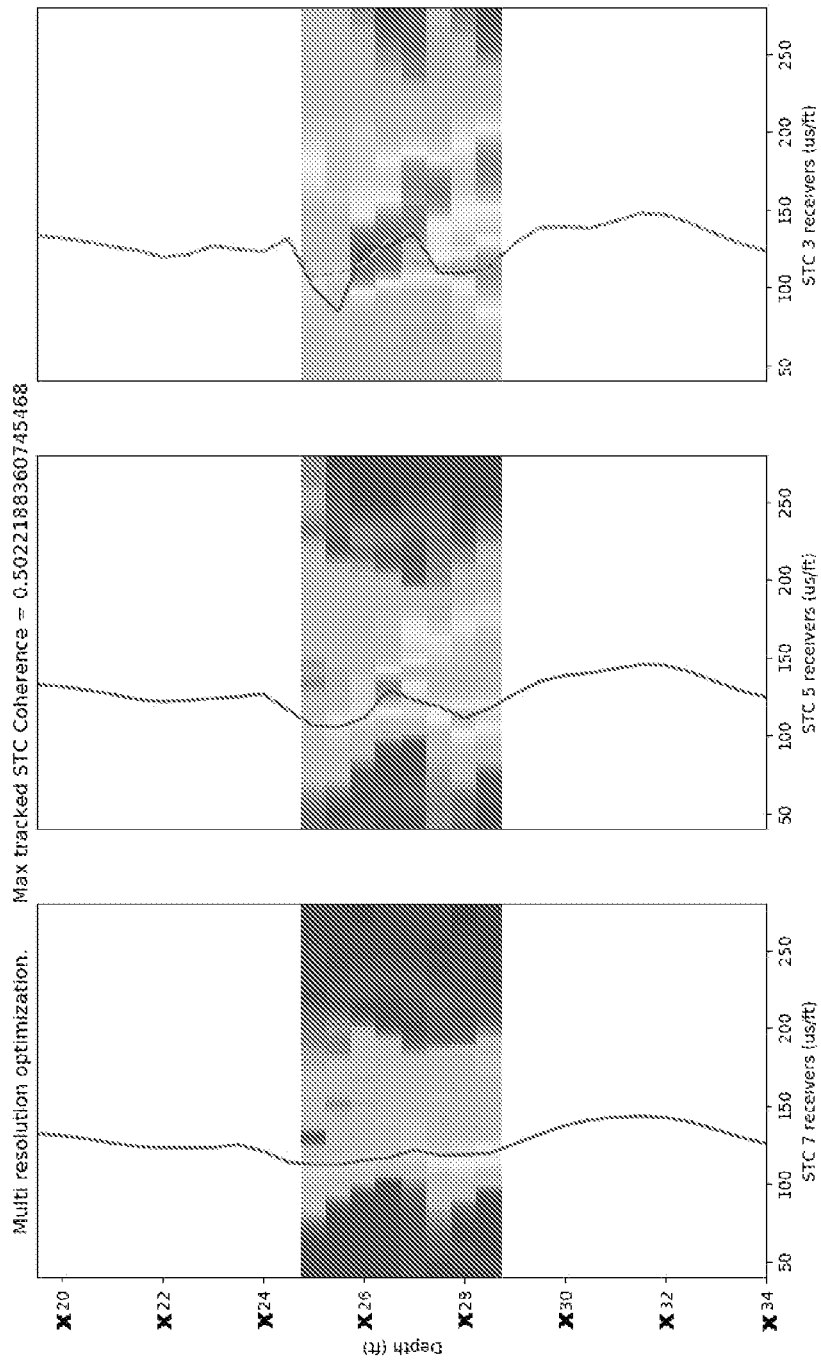
FIGS. 10A, 10B and 10C are STC coherence plots obtained using 7, 5, and 3 subarray receivers, which can be used as part of a multi-resolution based coherence optimization to patch gaps in depth tracking, such as gaps due to bad borehole conditions or large reflection from the formation thin beds.

Note the logs that are produced from the cluster based STC peak tracking may still have remaining gaps due to bad borehole conditions or large reflection from the formation thin beds. To further solve this issue, a multi-resolution based coherence optimization can be used to patch the remaining gaps. An illustrative example is shown in FIGS. 10A-10C, which represent the STC coherence projections obtained using 7, 5, and 3 subarray receivers, respectively. The solid curves are the inverted slowness logs that fill the gap between ×24.5 to ×28.5 ft. based on an optimization algorithm (such as the Nelder-Mead simplex algorithm (See Gao et al., "Implementing the Nelder-Mead simplex algorithm with adaptive parameters", Computational Optimization and Applications. 51:1, pp. 259-277, 2012). The dashed line denotes a random initial guess of 3-receiver log used in the optimization algorithm. The 5-receiver and 7-receiver initial logs are obtained by the convolution of 3-receiver logs using the convolution algorithms described in PCT/US2019/057912.

Figure 11:
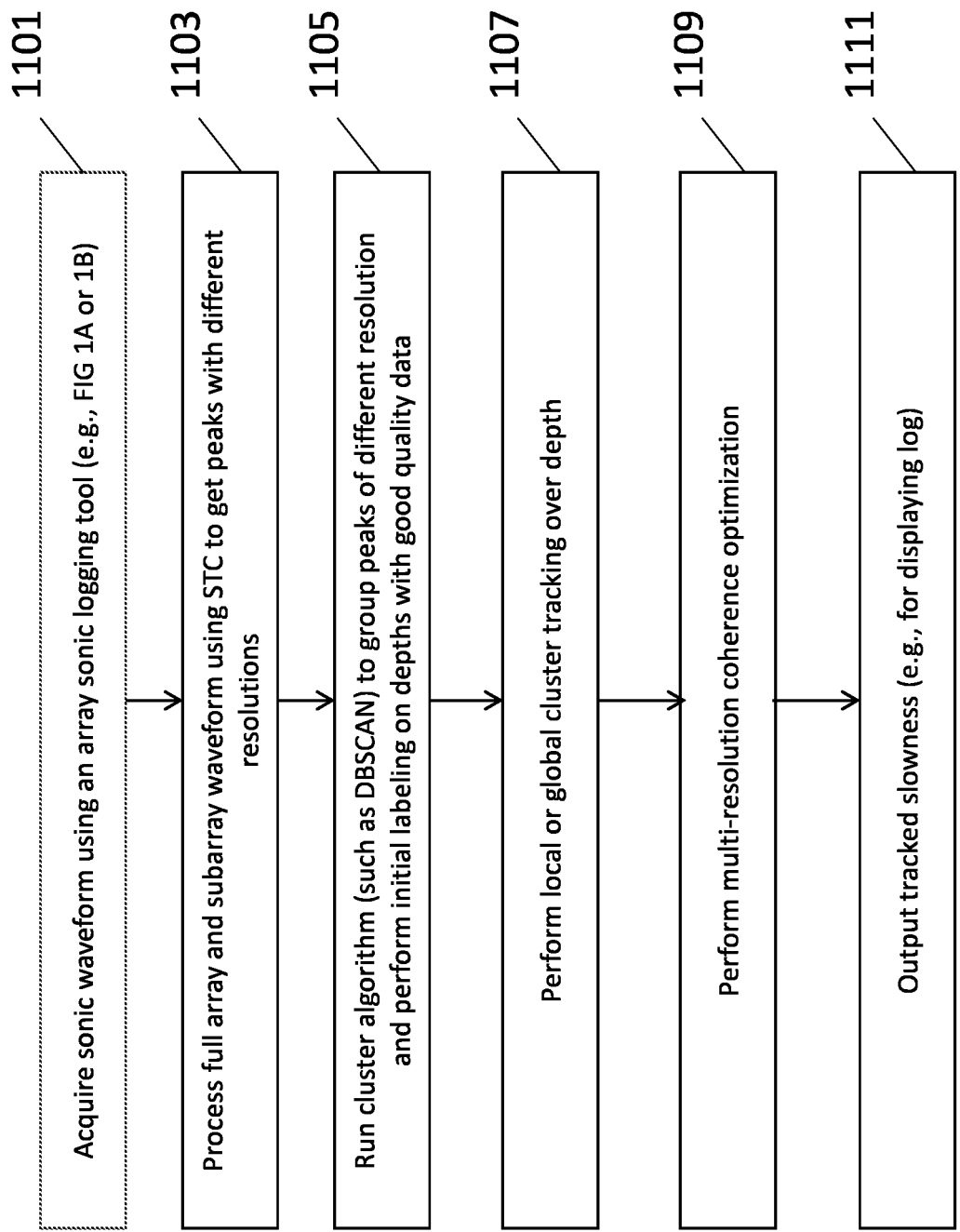
FIG. 11 is a flowchart illustrating an embodiment of a multi-resolution method or workflow according to the present disclosure.
Figure 12:
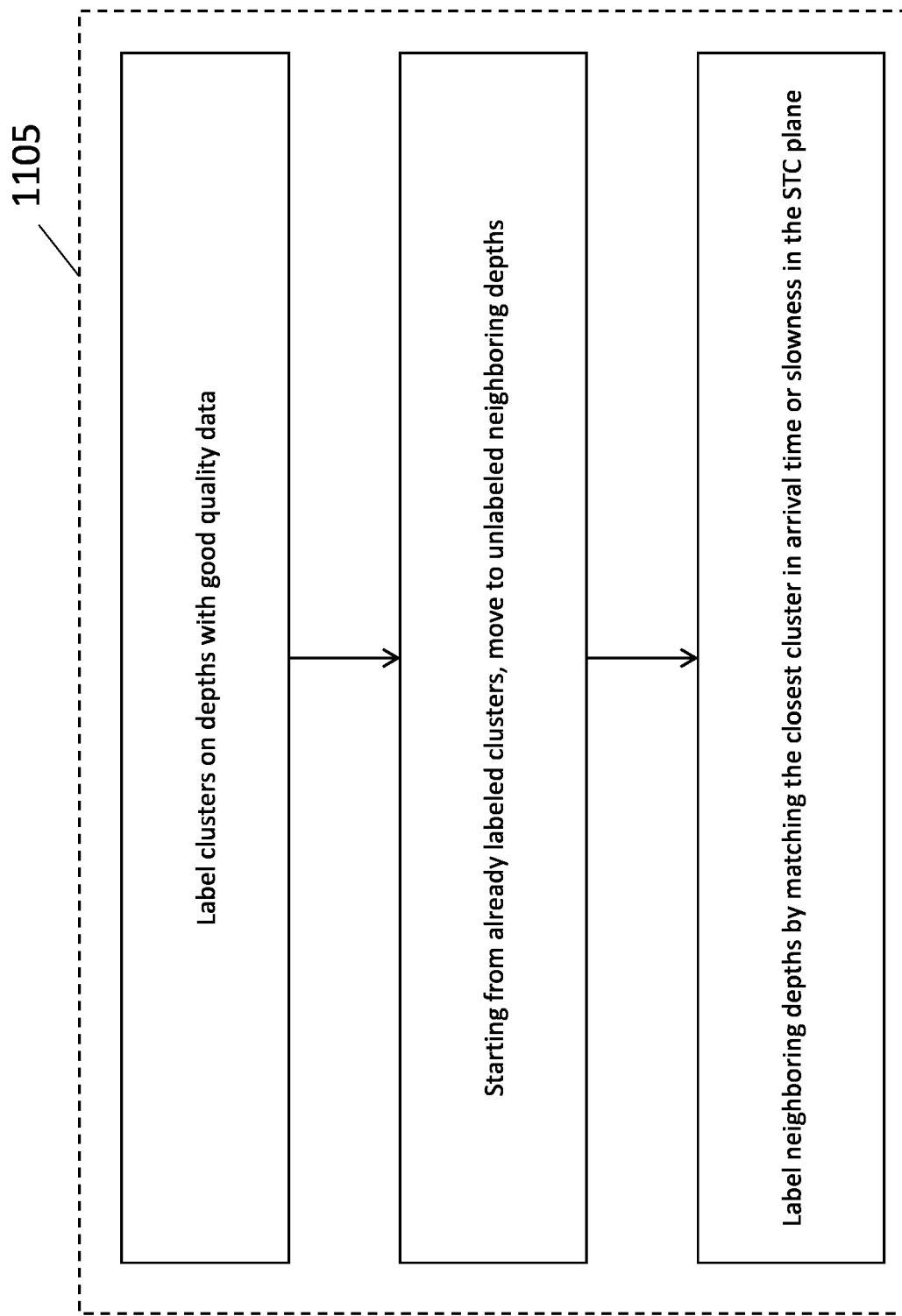
FIG. 12 is a flowchart illustrating details of the cluster vertex based labeling operations of block 1105 of the workflow of FIG. 11.
Figure 13:
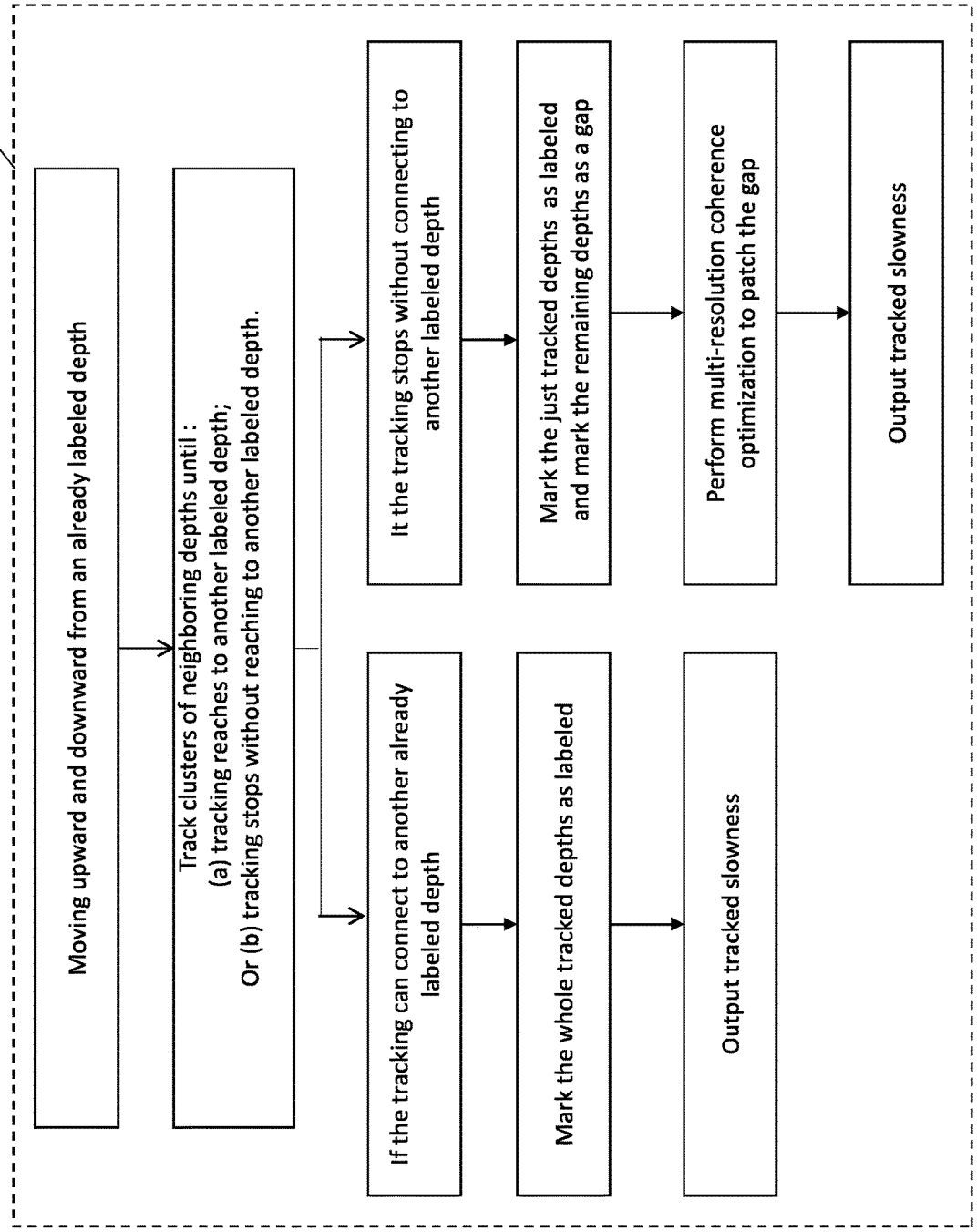
FIG. 13 is a flowchart illustrating details of the depth tracking operations of block 1107 of the workflow of FIG. 11.

An illustrative embodiment of a multi-resolution method or workflow is shown in FIG. 11. Details of the cluster vertex based labeling operations of block 1105 are depicted in FIG. 12, and details of the depth tracking operations of block 1107 are depicted in FIG. 13.

Finally, it is important to mention that this workflow can be extended to other scenarios such as in deviated wells, where the resolution peaks may also be measured by different acquisition frequencies and/or different azimuthal sensors. Then we can also cluster the resolutions from different azimuthal sensors or different frequency sensors to improve tracking reliability and remove outliers. In another case, if the depth sampling rate is high (e.g. a few inches) compared to the formation layers, such as the logging-while-drilling or ultrasonic logging cases, then we can also stack neighboring depths and consequently apply the clustering and tracking method mentioned in the present disclosure.

The multi-resolution cluster-based tracking method has several advantages over the traditional single-depth method, including:

1) The multi-resolution cluster-based method can be used to fill the gap which might be caused by thin layer or bad borehole shape.

2) The continuity of depth sampling rate is improved (i.e., the rate is doubled compared to single resolution approach).

3) Outliers can be automatically removed by clustering measured peaks that have different depth resolutions.

4) As a further step, remaining gaps from cluster tracking can be patched by the multi-resolution coherence maximization.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Figure 14:
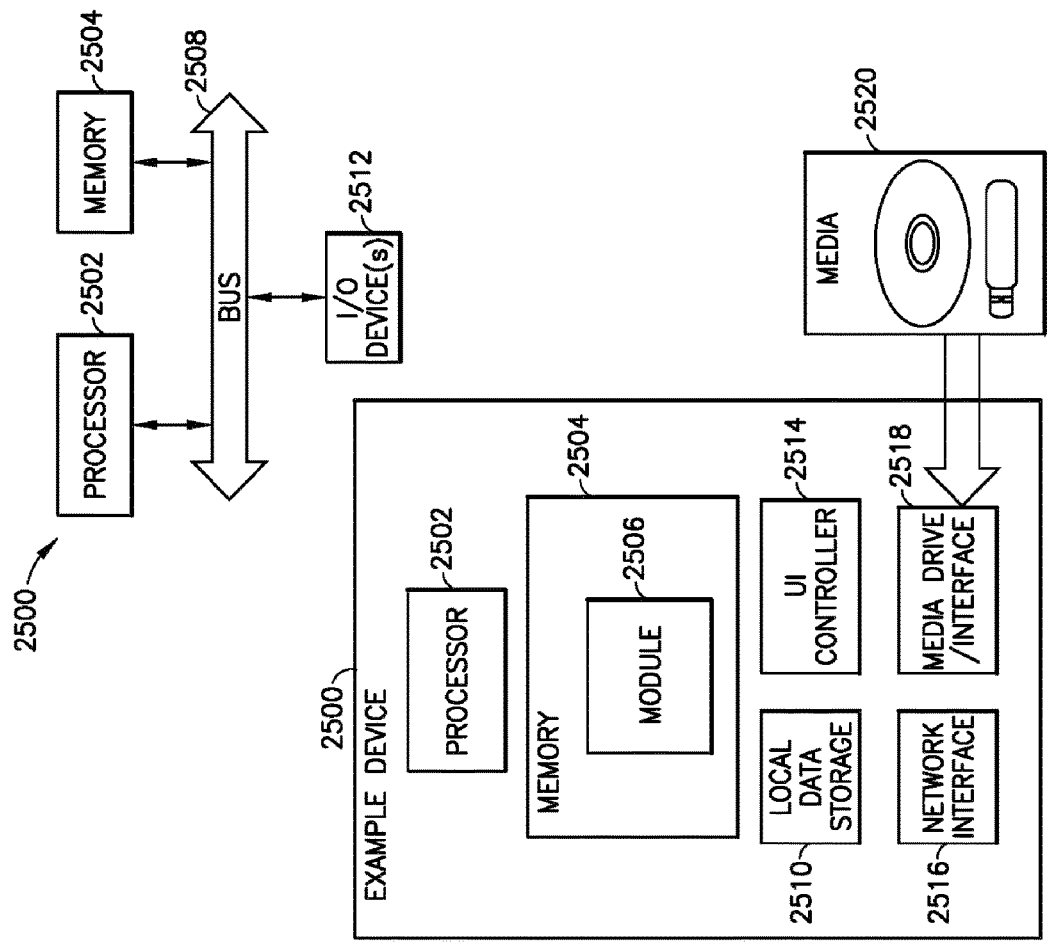
FIG. 14 is a schematic diagram illustrating an example computing device that can be used to embody parts of the methodology or workflow of the present disclosure.

FIG. 14 illustrates an example device 2500, with a processor 2502 and memory 2504 that can be configured to implement various embodiments of methods as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device, and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of a computer, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

The components, steps, features, objects, benefits and advantages that have been disclosed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages.

In one non-limiting embodiment, a method of characterizing properties of structures of interest in a formation traversed by a borehole is disclosed. The method may comprise operating a sonic logging tool in the borehole to transmit acoustic signals that probe nearby formation structures and to receive acoustic signals that result from interaction with the nearby formation structures. The method may also provide for generating waveform data associated with the received acoustic signals as a function of measured depth in the wellbore. The method may also provide for acquiring and/or processing the waveform data to identify or label clusters of Slowness-Time-Coherence peaks. The method may also provide for tracking at least one cluster of Slowness-Time-Coherence peaks over varying depth values. The method may also provide for performing a coherence optimization process on the at least one cluster of Slowness-Time-Coherence peaks to produce data. The method may also provide for generating a log of an acoustic property of the formation as a function of depth based on the data produced by the coherence optimization process.

In another example embodiment, the method may be performed wherein the acoustic property is slowness of the formation.

In another example embodiment, the method may further comprise using an optimization process to determine the acoustic property.

In another example embodiment, the method may be performed wherein the optimization process is a multi-resolution based coherence optimization process.

In another example embodiment, the method may be performed wherein the acoustic property is determined as a function of depth for at least one particular depth value.

In another example embodiment, the method may be performed wherein the multi-resolution based coherence optimization process includes grouping different resolution Slowness-Time-Coherence peaks.

In another example embodiment, the method may be performed wherein a machine-learning based algorithm is used to perform the grouping of the different resolution Slowness-Time-Coherence peaks.

In another example embodiment, the method may be performed wherein the algorithm uses a density-based spatial clustering.

In another example embodiment, the method further comprises applying a tracking algorithm to cluster vertices of the different resolution Slowness-Time-Coherence peaks.

In another example embodiment, the method may be performed wherein the applying the tracking algorithm is performed on a depth basis.

In another example embodiment, the method may further comprise selecting at least one peak inside a cluster to represent a formation slowness value.

In another example embodiment, the method may further comprise applying a deconvolution algorithm to the grouping of the different resolution Slowness-Time-Coherence peaks.

In another example embodiment, the method may be performed wherein the method is performed on a deviated well.

In another example embodiment, the method may be performed wherein the operating the sonic logging tool in the borehole to transmit acoustic signals that probe nearby formation structures includes operating the sonic logging tool at multiple frequencies.

In another example embodiment, the method may be performed wherein the receiving the acoustic signals that result from interaction with the nearby formation structures is performed by azimuthal sensors.

In another example embodiment, the method may be performed wherein the coherence optimization process is based on a Nelder-Mead simplex algorithm.

All references, including publications, patent applications and patents, cited herein are hereby incorporated by reference to the same extent as if each reference were individually and specifically indicated to be incorporated by reference and were set forth in its entirety herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

Nothing that has been stated or illustrated is intended to cause a dedication of any component, step, feature, object, benefit, advantage, or equivalent to the public. While the specification describes particular embodiments of the present disclosure, those of ordinary skill can devise variations of the present disclosure without departing from the inventive concepts disclosed in the disclosure.

In the present application, reference to an element in the singular is not intended to mean "one and only one" unless specifically so stated, but rather "one or more." All structural and functional equivalents to the elements of the various embodiments described throughout this disclosure, known or later come to be known to those of ordinary skill in the art, are expressly incorporated herein by reference.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of characterizing properties of structures of interest in a formation traversed by a borehole, comprising:
   operating a sonic logging tool in the borehole to transmit acoustic signals that probe nearby formation structures and to receive acoustic signals that result from interaction with the nearby formation structures;

generating waveform data associated with the received acoustic signals as a function of measured depth in the borehole;

acquiring and/or processing the waveform data to identify or label clusters of Slowness-Time-Coherence peaks;

tracking at least one cluster of Slowness-Time-Coherence peaks over varying depth values;

performing a coherence optimization process on the at least one cluster of Slowness-Time-Coherence peaks to produce data;

generating a log of an acoustic property of the formation as a function of depth based on the data produced by the coherence optimization process;

using an optimization process to determine the acoustic property; and applying a tracking algorithm to cluster vertices of different resolution Slowness-Time-Coherence peaks, wherein the optimization process is a multi-resolution based coherence optimization process which includes grouping the different resolution Slowness-Time-Coherence peaks, and wherein a machine-learning based algorithm is used to perform the grouping of the different resolution Slowness-Time-Coherence peaks.

2. The method according to claim 1, wherein the acoustic property is slowness of the formation.

3. The method according to claim 1, wherein the acoustic property is determined as a function of depth for at least one particular depth value.

4. The method according to claim 1, wherein the machine-learning based algorithm uses a density-based spatial clustering.

5. The method according to claim 1, wherein the applying the tracking algorithm is performed on a depth basis.

6. The method according to claim 1, further comprising: selecting at least one peak inside a cluster to represent a formation slowness value.

7. The method according to claim 1, further comprising: applying a deconvolution algorithm to the grouping of the different resolution Slowness-Time-Coherence peaks.

8. The method according to claim 1, wherein the method is performed on a deviated well.

9. The method according to claim 1, wherein the operating the sonic logging tool in the borehole to transmit acoustic signals that probe nearby formation structures includes operating the sonic logging tool at multiple frequencies.

10. The method according to claim 1, wherein the receiving the acoustic signals that result from interaction with the nearby formation structures is performed by azimuthal sensors.

11. The method according to claim 1, wherein the coherence optimization process is based on a Nelder-Mead simplex algorithm.

* * * * *